(12) United States Patent
Nedbal et al.

(10) Patent No.: US 9,210,193 B2
(45) Date of Patent: Dec. 8, 2015

(54) SYSTEM AND METHOD FOR FLEXIBLE NETWORK ACCESS CONTROL POLICIES IN A NETWORK ENVIRONMENT

(71) Applicant: McAfee, Inc., Santa Clara, CA (US)

(72) Inventors: Manuel Nedbal, Santa Clara, CA (US); Manoj Ahluwalia, San Jose, CA (US); Charles Slate, Milton, MA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

(21) Appl. No.: 14/494,890

(22) Filed: Sep. 24, 2014

(65) Prior Publication Data
US 2015/0012967 A1   Jan. 8, 2015

Related U.S. Application Data

(63) Continuation of application No. 13/417,154, filed on Mar. 9, 2012, now Pat. No. 8,874,766.

(51) Int. Cl.
*G06F 15/173* (2006.01)
*H04L 29/06* (2006.01)

(52) U.S. Cl.
CPC ............ *H04L 63/20* (2013.01); *H04L 63/10* (2013.01); *H04L 63/101* (2013.01); *H04L 63/104* (2013.01); *H04L 63/1408* (2013.01)

(58) Field of Classification Search
USPC ........... 709/203, 217, 228, 224, 200; 726/1, 3
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,874,766 B2 | 10/2014 | Nedbal et al. | |
| 2004/0128537 A1* | 7/2004 | Zurko et al. | 713/201 |
| 2005/0246767 A1* | 11/2005 | Fazal et al. | 726/11 |
| 2008/0219274 A1* | 9/2008 | Kato et al. | 370/401 |
| 2009/0113533 A1 | 4/2009 | Genty et al. | |
| 2009/0164377 A1 | 6/2009 | Aissi | |

(Continued)

OTHER PUBLICATIONS

McAfee Network Security Platform, McAfee, Data Sheet, copyright 2011 McAfee, Inc., 3 pages.

(Continued)

*Primary Examiner* — El Hadji Sall
(74) *Attorney, Agent, or Firm* — Patent Capital Group

(57) ABSTRACT

An example method includes capturing session attributes associated with a communication session initiated by a node in a network environment, querying external attributes associated with the node, deriving a response attribute according to an access control policy rule based on at least one of the session attributes and at least one of the external attributes, and applying the response attribute to the communication session. The session attributes can include remote authentication dial in user service RADIUS vendor specific attribute information from an unknown vendor. The method may further include auditing the communication session, enforcing the response attribute, or ignoring the access control policy. Enforcing the response attribute can include taking an access control action according to the response attribute. The access control action may include allowing the node to access a virtual local area network in the network environment, denying access to the network environment, etc.

20 Claims, 7 Drawing Sheets

(56) References Cited

U.S. PATENT DOCUMENTS

| | | |
|---|---|---|
| 2011/0185436 A1* | 7/2011 | Koulinitch et al. ............ 726/28 |
| 2011/0317838 A1* | 12/2011 | Garcia Morchon et al. .. 380/259 |
| 2012/0084184 A1* | 4/2012 | Raleigh et al. ................. 705/30 |
| 2012/0221955 A1* | 8/2012 | Raleigh et al. ............... 715/736 |

OTHER PUBLICATIONS

McAfee: Meeting Today's Command-Fleet-Wing Requirements, copyright 2009 McAfee, Inc., 28 pages.

McAfee Network Access Control 3.0—Product and Installation Guide, copyright 2008 McAfee, Inc., 88 pages.

C. Rigney, et al., "Remote Authentication Dial in User Service (RADISU)", RFC 2865, Jun. 2000, 77 pages.

C. Rigney, "RADIUS Accounting", RFC 2866, Jun. 2000, 29 pages.

Unified Secure Access Solution for Network Access Control, Solution Brief, copyright 2009 McAfee, Inc., 4 pages.

USPTO Jan. 6, 2014 Nonfinal Rejection in U.S. Appl. No. 13/417,154.

USPTO Jul. 8, 2014 Notice of Allowance in U.S. Appl. No. 13/417,154.

* cited by examiner

| # | Active | Sensor | Description | NAS | Health | Device | User | RADIUS Attribute | Operational Mode | Response |
|---|---|---|---|---|---|---|---|---|---|---|
| -- | ☑ | | PreAdmit Desc. | Any | Any | Any | Any | Any | Enforce | QVLAN |
| 1. | ✓ | Any | Executive Mobile | Any | Any | iPads, iPhone, other Mobiles | Executives | Any | Enforce | VLAN 1 |
| 2. | ✓ | Any | Block Any Access | CrownJewels | Any | Any | Any | Any | Audit | Close Port (deny) |
| 3. | ✓ | Any | Whitelisted Devices | Any | Any | Whitelist . Devs | Any | Any | Enforce | SwitchPortDefault |
| 4. | ✓ | Any | MAB bldg A | Bldg . A | Any | Any | Any | Ssid=test | Audit | VLAN 2 |
| 5. | ✓ | Any | Good | Any | Good | Any | Any | Any | Enforce | VLAN 2 |
| 6. | ✓ | Any | | Any | Any | Printers | Any | Any | Enforce | NAZ 1 |
| 7. | ✓ | Any | | Any | Any | Any | Any | Any | Ignore | |
| -- | ☑ | Any | DefaultRule Desc | Any | Any | Any | Any | Any | Enforce | NAZ 1 |

*FIG. 4*

| # (152) | Active (154) | Sensor (156) | Description (158) | NAS (160) | Health (162) | Device (164) | User (166) | RADIUS Attribute (168) | Operational Mode (170) | Response (172) |
|---|---|---|---|---|---|---|---|---|---|---|
| --- | ✓ | 182 Any | PreAdmit Desc. | Any | | | | Any | Enforce | QVLAN |
| 1. | ✓ | | Executive | Any | 184 Any | iPads, iPhone, | Executives | Any | 188 | VLAN 1 |
| 2. | ✓ (Enable) | | | | | Description ☐ | | Any | Enforce / Audit / Ignore | Close Port (deny) |
| 3. | ✗ (Disable) | | | | | Max.(64): 0 [OK] [Cancel] | | Ssid=test | | witchPortDefault |
| 4. | ✓ | Any | MA | Any | 186 Any / Bad / Good | Any | Any | Any | Audit | VLAN 2 |
| 5. | ✓ | Any | Good | Any | | Any | Any | Any | Enforce | VLAN 2 |
| 6. | ✓ | Any | | Any | Any | Printers | Any | Any | Enforce | NAZ 1 |
| 7. | ✓ | Any | | Any | Any | Any | Any | Any | Ignore | |
| --- | ✓ | Any | DefaultRule Desc | Any | Any | Any | Any | Any | Enforce | NAZ 1 |

SYSTEM AND METHOD FOR FLEXIBLE NETWORK ACCESS CONTROL POLICIES IN A NETWORK ENVIRONMENT

RELATED APPLICATION

This Application is a continuation (and claims the benefit of priority under 35 U.S.C. §120) of U.S. application Ser. No. 13/417,154, filed Mar. 9, 2012, entitled "SYSTEM AND METHOD FOR FLEXIBLE NETWORK ACCESS CONTROL POLICIES IN A NETWORK ENVIRONMENT," Inventors Manuel Nedbal, et al. The disclosure of the prior application is considered part of (and is incorporated by reference in) the disclosure of this application.

TECHNICAL FIELD

This disclosure relates in general to the field of network security and, more particularly, to a system and a method for flexible network access control policies in a network environment.

BACKGROUND

Proliferation of networks, private and public, physical and virtual, has led to unprecedented access to information, while at the same time, increasing risks of unauthorized access to the networks from various threats. Threats can include, for example, malware, zero-day attacks, botnets, denial-of-service attempts, and advanced targeted attacks. Moreover, as enterprises consolidate data centers, adopt cloud-services, and virtualize critical infrastructure, they are increasingly seeking ways to unify security management across physical and virtual infrastructures, for example, through comprehensive network security solutions that deliver real-time threat prevention against a wide array of network-attacks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified diagram illustrating an example screen shot according to an embodiment of the communication system;

FIG. 5 is a simplified diagram illustrating another example screen shot according to an embodiment of the communication system;

DETAILED DESCRIPTION OF EXAMPLE EMBODIMENTS

Overview

An example method includes capturing session attributes associated with a session initiated by a first node in an attempt to access a second node in a network environment, querying external attributes associated with the first node and the second node, deriving a response attribute according to an access control policy rule based on at least one of the session attributes and at least one of the external attributes, and applying the response attribute to the session.

In specific embodiments, the session attributes can include remote authentication dial in user service (RADIUS) vendor specific attribute (VSA) information from an unknown vendor. In particular embodiments, the session attributes and the external attributes include at least one selection from a group including: a point of attachment, a health level of the first node, a user group of the first node, a device group of the first node, another device group of the second node, RADIUS attributes, and time of day.

In other embodiments, the method may further include auditing the communication session, enforcing the response attribute, or ignoring the access control policy rule. In particular embodiments, the access control action can include allowing the first node to access a virtual local area network (VLAN) comprising the second node, allowing the first node to access a network access zone (NAZ), allowing access to the first node according to an access control list (ACL), denying access to the second node, denying access to the network environment, setting an access port in the network environment to a default port, or placing the first node in a pre-admission group, etc. In various embodiments, the method may further include registering hooks to select the one or more session attributes and the one or more external attributes.

Example Embodiments

Figure 1:
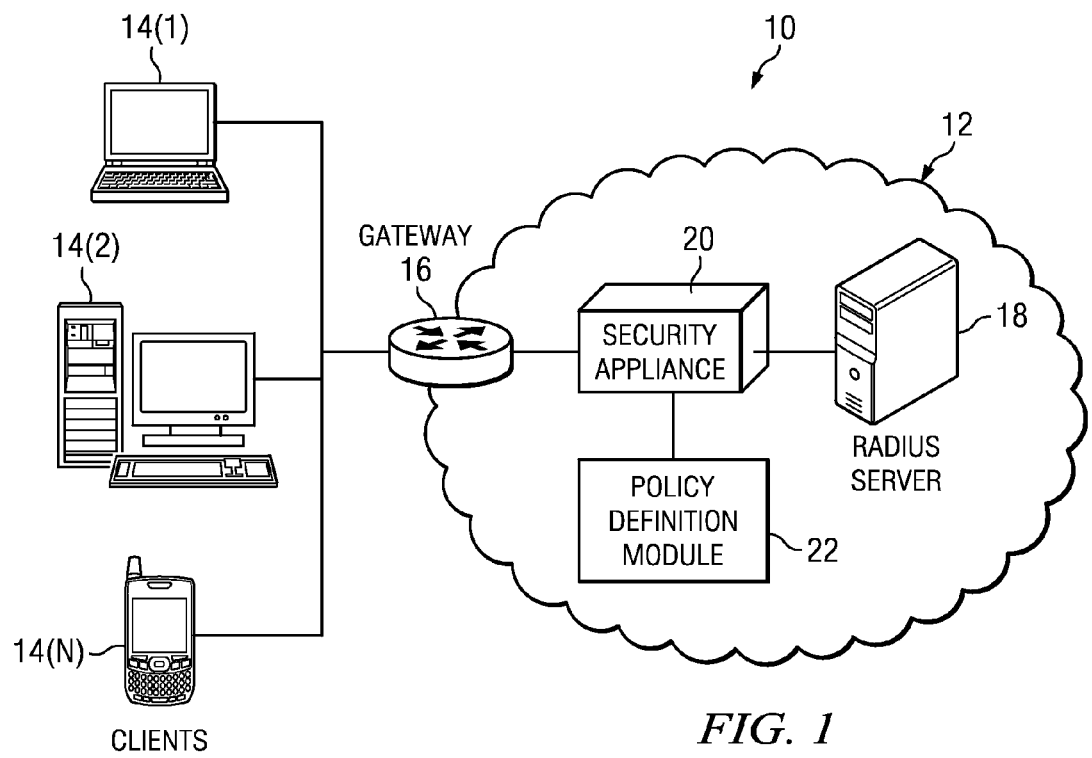
FIG. 1 is a simplified diagram of one embodiment of a communication system for flexible network access control policies in a network environment.

Turning to FIG. 1, FIG. 1 is a simplified block diagram of a communication system 10 for flexible network access control policies in a network environment. The architecture of FIG. 1 may include a network 12 to which one or more clients 14(1)-14(N) communicate through a gateway 16. Gateway 16 may communicate with a remote authentication dial in user service (RADIUS) server 18 to enable clients 14(1)-14(N) to connect to network 12. A security appliance 20 may intercept communication between gateway 16 and RADIUS server 18, and access a policy definition module 22 to enable flexible network access control policies in network 12.

As used herein, the term "session" includes an interactive information interchange between two or more communicating nodes. A "node" may be any electronic device (e.g., machine device or a mobile device), client, server, peer, service, application, or other object capable of sending, receiving, or forwarding information over communications channels in a network. In general, sessions may be implemented as part of protocols and services at the application layer, session layer or transport layer in an Open Systems Interconnection (OSI) model. In particular embodiments, the session may include communication using the RADIUS protocol. In embodiments of communication system 10, a session between client 14 and a target node (not shown) may be initiated by client 14, and routed via gateway 16. References herein to "client 14" are made for ease of explanation and are intended to refer to any one of clients 14(1)-14(N).

Embodiments of communication system 10 may capture session attributes associated with the session initiated by client 14, query external attributes associated with client 14, derive a response attribute according to an access control policy rule based on one or more of the session attributes and the external attributes, and apply the response attribute to the session, for example, by inserting the response attribute into network packets associated with the communication session. An access control policy authorizes users (e.g., clients 14(1)-14(N)) to access certain services within network 12. Unless authorized through one or more access control policies, clients 14(1)-14(N) may have no access to any services within network 12. The access control policy rule is an instruction that implements the corresponding access control policy.

As used herein, the term "attribute" refers to a quality, feature, or characteristic. Attributes of a session ("session attributes") include session state (e.g., enabled, disabled etc.); point of attachment (e.g., location, network access server (NAS) internet protocol (IP) address and port, etc.); extended attributes (e.g., free form RADIUS attributes); etc. Attributes of nodes ("external attributes") include health level (e.g., representing a current security/compliance state of the node (e.g., client 14)); device group (e.g., device class of the node such as computer, printer, etc.); user group (e.g., group within network 12 to which the node belongs); etc. Session attributes may overlap with external attributes in some embodiments. For example, IP address of client 14 may be included as a session attribute and an external attribute. "Response attributes" include policy operational modes (e.g., rule enforcement type such as enforce, audit, etc.); access control actions (e.g., allowing client 14 to access a virtual local area network (VLAN) in network 12, allowing client 14 to access a network access zone (NAZ) in network 12, allowing access according to an access control list (ACL), denying access to network 12, setting an access port in network 12 to a default port, placing client 14 in a pre-admission group, etc.); etc.

RADIUS is a client/server networking protocol that provides centralized Authentication, Authorization, and Accounting (AAA) management for networks (e.g., network 12). RADIUS serves at least three functions: (i) authenticate clients 14(1)-14(N) before granting them access to network 12; (ii) authorize clients 14(1)-14(N) for certain network services; and (iii) account for usage of those services. According to Internet Engineering Task Force (IETF) Request for Comments (RFC) 2865 and RFC 2866 standards, each RADIUS packet includes certain RADIUS attributes (e.g., user name, password, service type, IP address, various tunnel attributes, etc.).

In particular, a RADIUS attribute type, in a standardized type-length-value (TLV) format, encapsulates vendor specific attributes, thereby allowing vendors (e.g., network service providers) to support their own extended attributes otherwise not suitable for general use. In various embodiments, policy definition module 22 may provide an option to include any type of RADIUS attribute from known or unknown vendors into an access control policy definition in communication system 10. In contrast to embodiments of communication system 10, because vendor specific attribute (VSA) information is, by its very nature, not standardized, existing security solutions typically do not use the VSA information to define access control policies, leading to lack of flexibility and visibility in defining such policies. Unlike access control policies used by policy definition module 22, typical access control policies are based on at most three attributes of the clients: identity; location; and health.

According to various embodiments of communication system 10, information about client health, location, identity and device type can be included in the policy definition of access control policies. Various attribute classes may be captured in an access control policy rule that may be mapped to one or more response attributes. Users can enforce changes by supplying virtual local area networks (VLANs) or access control lists (ACLs) to be enforced by gateway 16 in appropriate response attributes. Embodiments of communication system 10 can empower administrators to mix and match any session attribute and/or external attribute into a single, streamlined set of rules. The flexibility of such a rules-driven approach enables compatibility with existing firewall-type solutions. For example, users familiar with existing firewall-type solutions may become accustomed quickly to implementations of embodiments of communication system 10. Moreover, embodiments of communication system 10 may enable configuration according to properties of a NAS and/or RADIUS server that may be used in the future and whose properties are not currently known (for example, a server that may not yet be in use), in addition to various other advantages.

According to various embodiments, security appliance 20 may be built for detection and prevention of network intrusions, network misuse and distributed denial-of-service (DoS) attacks, among other network threats. Security appliance 20 can provide real-time traffic monitoring to detect malicious activity and respond to malicious activity as configured by a network administrator. For example, security appliance 20 can analyze traffic on selected network segments and respond when an attack is detected. In various implementations, security appliance 20 may examine network packets according to user-configured policies (including access control policies), looking for patterns and behavior in the network traffic that indicate malicious activity. If an attack is detected, security appliance 20 may respond according to its configured policy (e.g., generate alerts and packet logs, reset transmission control protocol (TCP) connections, change a VLAN that a client is admitted to, scrub malicious packets, etc.). In various embodiments, security appliance 20 may complement firewall and anti-virus software deployed in enterprises by providing network packet content inspection and protecting against attacks embedded within what a firewall might perceive as seemingly benign network traffic.

In particular embodiments, security appliance 20 may be used as a RADIUS proxy, to provide routing of RADIUS messages between gateway 16 and RADIUS server 18. In one implementation, gateway 16 may receive connection requests from access clients 14(1)-14(N). Gateway 16, configured to use RADIUS as the AAA protocol, may create an Access-Request message and send it to security appliance 20, which acts as the RADIUS proxy. Security appliance 20 can forward the Access-Request message to RADIUS server 18. RADIUS server 18 may evaluate the Access-Request message and subsequently authenticate and authorize the connection attempt through an Authorization message.

Security appliance 20 may receive the Authorization message and, based on locally configured connection request policies according to policy definition module 22, determine a suitable response applicable to the network access connection. For example, security appliance 20 may forward the RADIUS packets (e.g., Authorization message) to policy definition module 22. Policy definition module 22 may capture session attributes from the RADIUS packets, query external attributes from other sources (e.g., external databases), and derive a set of response attributes according to an access control policy rule based on one or more of the session attributes and the external attributes. Policy definition module 22 may apply the set of response attributes to the session (e.g., by inserting the set of response attributes into the Authorization message(called Post-Authorization message) and forwarding the modified Post-Authorization message to gateway 16 through security appliance 20).

In parallel, security appliance 20 can pull user-specific data and device- specific data from external sources. Following successful authentication of the session, authorization data collected from the RADIUS server and other external sources, a first matching rule with a corresponding identification number (e.g., rule ID) may be derived at security appliance 20. The rule ID can define which set of response attributes may be applied to the corresponding session with the respective client (e.g., 14(1)-14(N)).

Policy definition module 22 is an application (e.g., computer program) that may be implemented on security appliance 20, or on other network elements to facilitate the activities discussed herein. Policy definition module 22 may be bundled with security appliance 20 and/or other network elements (e.g., gateway 16 and/or RADIUS server 18), and associated system software, or it may be implemented separately. As used herein, the term "network element" is meant to encompass computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Turning to the infrastructure of FIG. 1, security appliance 20 is shown in an in-line mode between gateway 16 and RADIUS server 18, mediating the flow of traffic between gateway 16 and RADIUS server 18. In various embodiments, security appliance 20 may be deployed in a port-clustering mode, enabling traffic monitored by multiple ports on a single device (e.g., router or switch) to be aggregated into one traffic stream for stateful inspection analysis. In other embodiments, communication system 10 may support high-availability deployments using redundant security appliances, avoiding a single point of failure. Security appliance 20 may also be deployed in switch port analyzer (SPAN) and tap modes. In the SPAN mode, security appliance 20 may monitor hubs or SPAN ports on multiple switches and can inject several response actions, such as TCP resets, to terminate malicious connections through the monitoring port itself. In various embodiments, SPAN may not work in a proxy mode (e.g., using security appliance 20 as a proxy for RADIUS server 18) and authentication channel being monitored. Rather the SPAN may work for inline data traffic. In tap mode, full-duplex monitoring may allow a direction sensitive view of network traffic, enabling stateful analysis of traffic. In embodiments where a network has two different active paths passing through two different security appliance interfaces, the traffic on each path may be analyzed independently.

Elements of FIG. 1 may be coupled to one another through one or more interfaces employing any suitable connection (wired or wireless), which provides a viable pathway for electronic communications. Additionally, any one or more of these elements of FIG. 1 may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

Security appliance 20 may be provisioned on, or form an integral part of, or be associated with, any device that handles RADIUS protocols, including network access servers, load balancers, Intrusion Prevention Systems, firewalls, or other such security appliances. Policy definition module 22 may be implemented on any application that uses RADIUS such as network access servers, gateways, etc. Each network connection between gateway 16 and RADIUS server 18 may be processed by more than one security appliance 20. Moreover, a plurality of security appliances may be deployed in each network and each security appliance 20 may be provisioned with policy definition module 22.

Gateway 16 may include any network element that controls access to networks (e.g., network 12) such as Remote Access Servers, Virtual Private Network servers, network switches, and Network Access Servers (NAS). Gateway 16 may have a RADIUS client component that communicates with RADIUS server 18. In various embodiments, RADIUS server 18 may include a process (e.g., background process) running on a server (e.g., UNIX or Microsoft Windows server). In some embodiments, security appliance 20 and/or policy definition module 22 may be integrated with gateway 16 and/or RADIUS server 18.

As used herein, the terms "client" and "server" are inclusive of applications (e.g., Web browsers), and devices (e.g., computers, laptops, mobile phones, mobile computing devices, mainframes, etc.) that perform functionalities associated with a client/server distributed computer networking architecture. Clients (e.g., 14) typically request and receive information over a network (e.g., 12) for example, by sending messages. In particular embodiments, clients 14(1)-14(N) may be configured with a RADIUS client component. Servers (e.g., 18) may respond to clients by acting on each request and returning results. One server (e.g., 18) generally supports numerous clients (e.g., 14), and multiple servers can be networked together in a pool to handle increased processing load as the number of clients grows. In some cases, a device that is a server for one application can simultaneously act as a client to other servers for different applications.

In particular, RADIUS server 18 may include a central management component that processes and stores system detections (e.g., of malware and network attacks), scan assessment information, etc. RADIUS server 18 may provide for policy configuration and management, and provide for reporting and monitoring services, for example, in the form of queries and monitors, which gather and display system and network information related to network access control. For unmanaged systems, RADIUS server 18 may maintain setup configuration data, and send health information to supported products that handle unmanaged system enforcement. In some embodiments, policy definition module 22 may communicate with RADIUS server 18 to access policies and other configuration items.

In various embodiments, security appliance 20 may act as a client to RADIUS server 18 in terms of enforcing access control policies. For example, security appliance 20 may assess the health of clients 14(1)-14(N) attempting to access network 12, using system health policies that are assigned to the respective client. In some embodiments, access control policies may be active based on a client's connection to specific logical segments of network 12 (e.g., VLANs). In some embodiments, security appliance 20 may restrict client 14's network access by using an outbound-only firewall that blocks new connections, while existing connections remain unaffected. Security appliance 20 may communicate information to RADIUS server 18, and to other integration points in supported network security products within network 12.

In other embodiments, the central management component for defining access control policies may be located on a separate network access control (NAC) server, which is not shown in FIG. 1. In such embodiments, policy definition module 22 may communicate with the NAC server to access policies and other configuration items. In various embodiments, NAC clients may be installed in various sensors and other security devices (apart from security appliance 20). In yet other embodiments, each client 14(1)-14(N) may be equipped with appropriate NAC clients. Such NAC clients, although not shown in FIG. 1, are encompassed within the broad teachings of the present disclosure.

Not shown in FIG. 1 are components that may be associated with security appliance 20, such as manager hardware/controller, routers, switches, and other network elements. For example, a manager platform associated with security appliance 20 may include a dedicated server hosting manager platform software to configure/control operations of security appliance 20. The manager platform may allow remote access of security appliance 20 from within an enterprise network, for example. Communication system 10 may also include databases (e.g., for storing persistent configuration information, policies, vulnerabilities, etc.) that may be communicable with security appliance 20. Various components associated with security appliance 20 may provide for collecting and analyzing traffic from hosts and applications to detect worms, botnets, and other malicious software.

Network 12 offers a communicative interface between any of the components of FIG. 1, and may be any local area network (LAN), wireless local area network (WLAN), metropolitan area network (MAN), wide area network (WAN), virtual private network (VPN), Intranet, or any other appropriate architecture or system that facilitates communications in a network environment. The network may implement a UDP/IP connection and use a TCP/IP communication language protocol in particular embodiments of the present disclosure. However, the network may alternatively implement any other suitable communication protocol for transmitting and receiving data packets within communication system 10.

Figure 2:
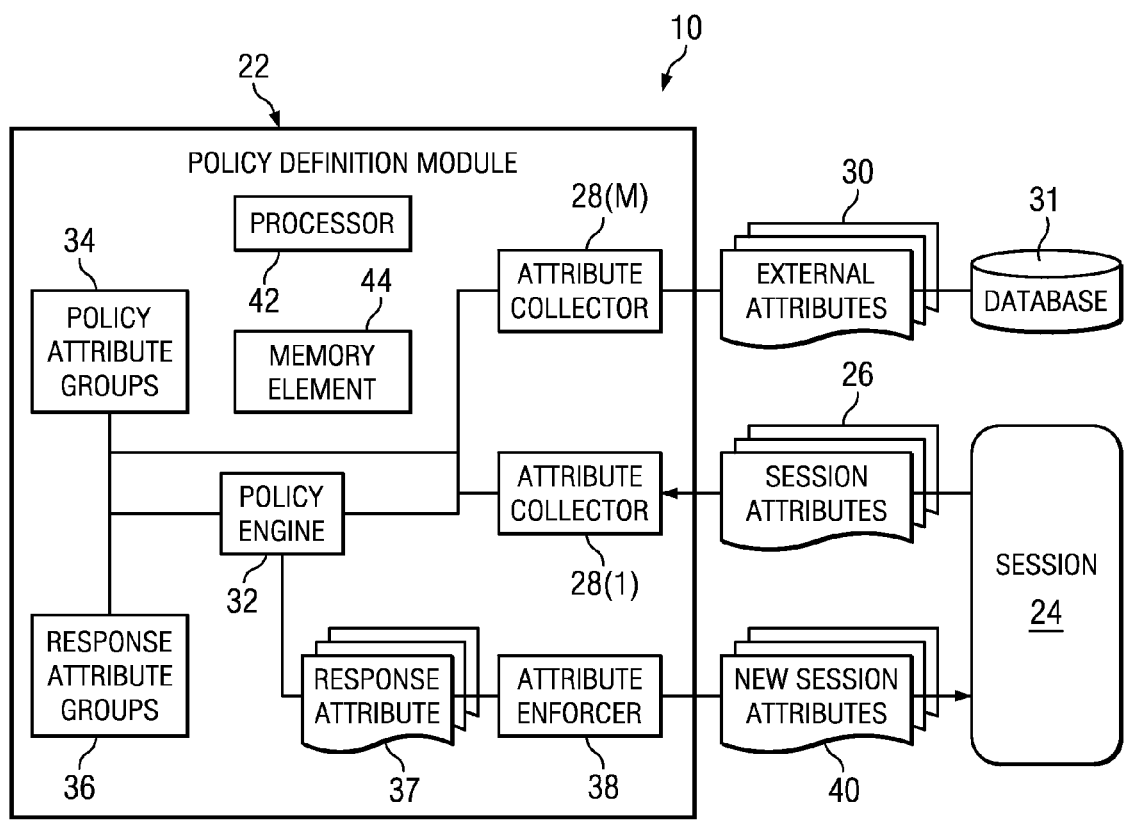
FIG. 2 is a simplified diagram illustrating details of an embodiment of the communication system.

Turning to FIG. 2, FIG. 2 is a simplified block diagram illustrating additional details of an embodiment of communication system 10. Policy definition module 22 may process a session 24. Session 24 may be initiated by client 14, routed through gateway 16, and intercepted by security appliance 20. Session attributes 26 may be captured by policy definition module 22 and sent to attribute collector 28. Session attributes 26 include RADIUS attributes (i.e., standard attributes described in RFC 2865 and RFC 2866) in the RADIUS packets sent from gateway 16. Examples of such RADIUS attributes include, without limitation: user-name, user-password, Challenge Handshake Authentication Protocol (CHAP) password, CHAP challenge, NAS IP Address, NAS port, NAS port type, service type, framed protocol, framed IP address, framed routing, filter ID, port limit, tunnel type, etc.

Policy definition module 22 may include a plurality of attribute collectors 28(1)-28(M). In various embodiments, attribute collectors 28(1)-28(M) may be configured to query and collect various attributes from a variety of sources. For example, attribute collector 28(1) may collect session attributes 26 from session 24; attribute collector 28(M) may collect external attributes 30 (e.g., user group, device group, etc.) from one or more external databases 31; etc. External databases 31 may include any database such as network access control databases (e.g., that store user account information for authorized clients); policy databases (e.g., that store enterprise policy for security management); etc. from which attributes may be retrieved. Moreover, external databases could be provided by a third party (e.g., McAfee ePO database, McAfee Network Access Control (MNAC) database) or could be integrated with a network security solution.

In various embodiments, external database 31 may be located within network 12. In other embodiments, external database 31 may be located on a remote cloud separate from network 12, and accessible over the Internet. Policy definition module 22 may have suitable network interfaces and external communication mechanisms that enable retrieving attributes asynchronously (e.g., through asynchronous transfer mode (ATM)) from external databases 31. In some embodiments, external databases 31 may be connected to other network elements and/or computing devices (not shown) that analyze the queries from policy definition module 22 to determine relevant device types of client 14 or the target node, to which client 14 seeks access.

A policy engine 32 may analyze the various attributes collected by attribute collectors 28(1)-28(M), including session attributes 26 and external attributes 30. In one embodiment, policy engine 32 may read policies and obtain relevant session attributes and/or external attributes (e.g., point of attachment, health level, device group, user group, RADIUS attributes, time of day (e.g., when attributes are relevant), etc.) from policy attribute groups 34, and register appropriate hooks corresponding to the relevant attributes in attribute collectors 28(1)-28(M). Hooks can intercept captured and/or retrieved attributes, and act as filters in some embodiments. For example, the hooks may cause attribute collectors 28(1)-28(M) to send the hooked attributes to policy engine 32, and ignore the remaining attributes in session attributes 26. In another embodiment, attribute collectors 28(1)-28(M) may supply session attributes 26 and external attributes 30 to policy attribute groups 34. By using session attributes 26 and/or external attributes 30 in access control policy rules, such session attributes and/or external attributes may be included in the hooks registered by policy engine 32.

In another embodiment, policy engine 32 may receive substantially all attributes from attribute collectors 28(1)-28(M) and analyze only those attributes that are defined in policy attribute groups 34. Policy attribute groups 34 may group session attributes and external attributes into various classes (e.g., point of attachment, health level, device group, user group, RADIUS attributes, etc.) for example, to define appropriate access control policy rules.

Policy engine 32 may apply an access control policy rule to the various attributes, and lookup response attribute groups 36 to determine an appropriate response attribute 37. Access control policies and corresponding rules may be formatted in any language. such as extensible markup language (XML), semantic web rule language (SWRL), etc. In various embodiments, the access control policy rules can permit an agent (e.g., client 14) to perform an action (e.g., read or write, etc.) on a resource (e.g., computer), or prohibit the agent from performing the action on the resource, based on conditions provided by the attributes (e.g., agent with particular attributes permitted to read from a specific resource, etc.)

For example, a rule 1 may indicate that for a particular set of attributes: {<active>=yes; <sensor>=any; <description>=ExecutiveMobile; <NAS>=any; <health>=any; <device>=iPad,® iPhone,® other mobiles; <user>=executive; <RADIUS attribute>=any; <operational mode>=enforce}, the appropriate response from response attribute groups 36 is to enable the client with those attributes to connect to a specific VLAN (e.g., VLAN 1) in network 12. The selected VLAN (e.g., VLAN 1) may have certain specific security configurations and network connectivity that are applicable to mobile devices. For example, VLAN 1 may provide access to the network's email servers and certain limited number of computers and printers and deny access to all other devices on network 12. Thus, when an executive connects to network 12 with the executive's iPhone, policy engine 32 may apply rule 1 with the name "ExecutiveMobile" to the session and derive the appropriate response: {<response>=VLAN1}. Response attribute groups 36 may group response attributes into various classes such as VLAN, NAZ, SwitchPortDefault, etc. for example, to flexibly define access control policy rules.

In some embodiments, if attribute collectors 28(1)-28(M) take some time (e.g., few seconds to a few minutes) to query and retrieve external attributes 30, policy engine 32 may cause the respective client 14 to be placed into a pre-admission group (e.g., <response>="QVLAN"), awaiting further action while the RADIUS packet is forwarded to RADIUS server 18 for authentication. When substantially all external attributes 30 have been retrieved and analyzed, policy engine 32 may change the <response>attribute to the applicable response (e.g., <response>=VLAN 1).

Policy engine 32 may forward response attribute 37 to an attribute enforcer 38, which may apply response attribute 37 to session 24, for example, by inserting response attribute 37 into new session attributes 40 of session 24. New session attributes 40 may be included in the message forwarded to RADIUS server 18 and/or applied to the appropriate IP session with respective client 14. For example, gateway 16 may appropriately route packets from client 14 to the parts of network 12 authorized according to response attribute 37 in new session attribute 40. Thus, in the example where the executive connects to network 12 with the executive's iPhone, the session authorized by RADIUS server 18 may enable the executive to connect to VLAN 1 to the exclusion of other VLANs in network 12. In various embodiments, policy definition module 22 may use a processor 42 and a memory element 44 for performing various operations as described herein.

Figure 3:
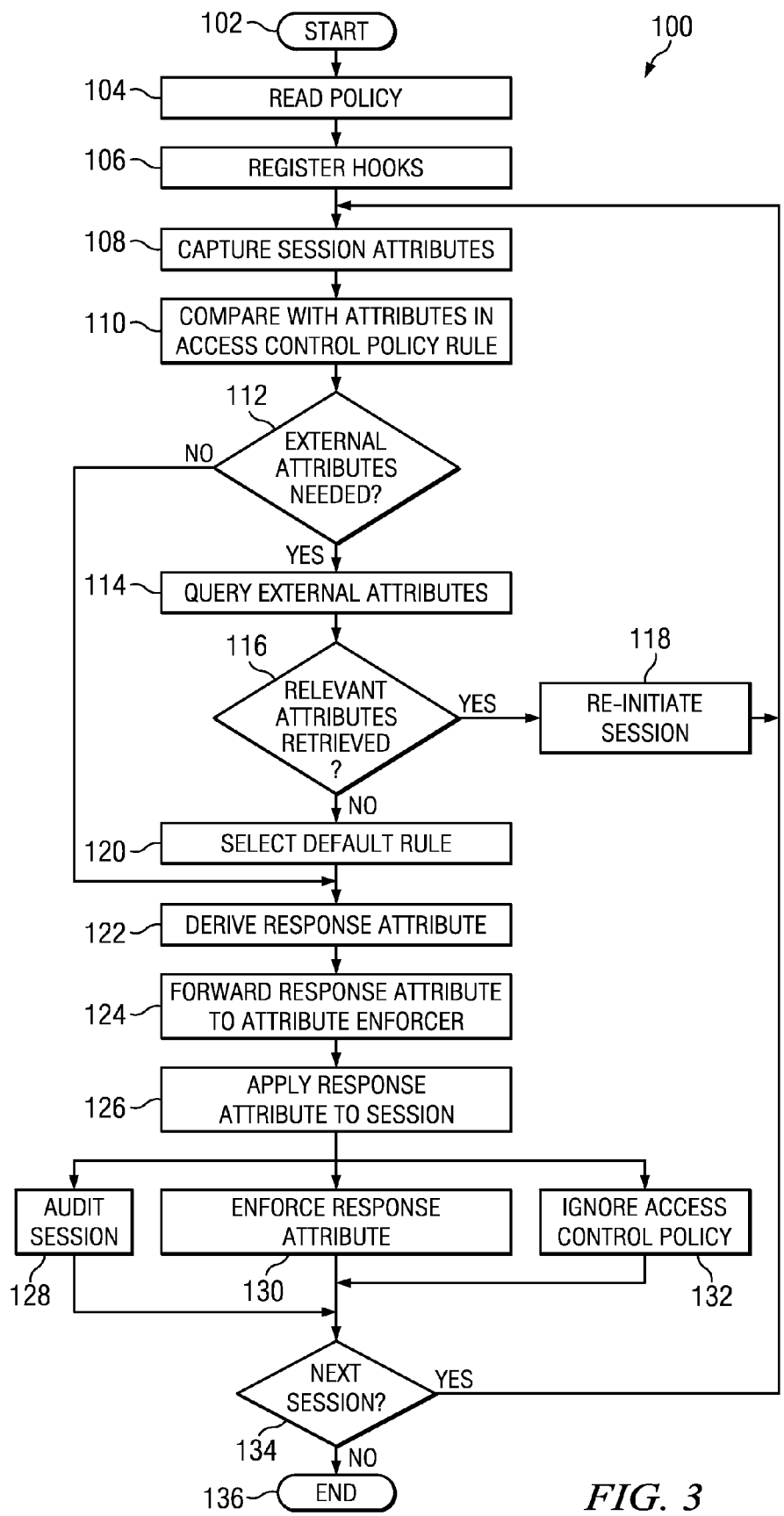
FIG. 3 is a simplified flow diagram illustrating example operational activities that may be associated with embodiments of the communication system.

Turning to FIG. 3, FIG. 3 is a simplified flow diagram of example operational activities that may be associated with embodiments of communication system 10. Operations 100 start at 102, when session 24 (e.g., initiated by client 14) is established through security appliance 20. At 104, policy engine 32 may read policies and obtain relevant attributes from policy attributes group 34. At 106, policy engine 32 may register appropriate hooks corresponding to the relevant attributes in attribute collector 28. In one embodiment, steps 102, 104 and 106 may be performed once, during configuration of communication system 10.

At 108, for each session, attribute collector 28(1) may capture session attributes 26 from session 24. At 110, captured session attributes 26 may be compared with attributes in available access control policy rules. At 112, a determination may be made whether external attributes are needed to derive response attribute 37. If yes, then various attribute collectors 28(2)-28(M) may query external databases 31 for external attributes 30. At 116, policy engine 32 may check if relevant external attributes 30 (e.g., sufficient to derive response attributes 37 from applicable access control policy rules) have been retrieved. If relevant external attributes 30 have been retrieved (e.g., after a pre- determined time), the session may be re-initiated at 118, and the operations may loop back to 108. If relevant external attributes 30 have not been retrieved at 116, a default access control policy rule may be selected at 120. For example, policy definition module 22 may cause respective client 14 to be placed into a pre-admission group. The operations may thereafter step to 122.

Turning back to step 112, if additional external attributes 30 are not needed, the operations may step to 122. At 122, policy engine 32 can lookup response attribute groups 36 to derive suitable response attribute 37 from response attribute groups 36. At 124, policy engine 32 may forward response attribute 37 to attribute enforcer 38. At 126, attribute enforcer 38 may apply response attribute 37 to session 24. At 128, policy definition module 22 may cause security appliance 20 and/or gateway 16 to audit session 24, or alternatively, enforce response attribute 37 at 130, or alternatively, ignore the access control policy at 132.

Auditing session 24 includes recording session 24, while not enforcing response attribute 37. Auditing may be implemented in cases where enforcing access control policy rules is not recommended, or may not be desired. For example, a new client (e.g., client 14(1)) attempting to connect to network 12 for the first time may not be included in any user group, device group, etc. The health level of client 14(1) may be unknown. Although access control policy rules may allow client 14(1) to connect to VLAN1, it may be advisable to monitor client 14(1)'s session with a network 12 rather than permit access to VLAN1. In another example, a network administrator may have put in a new access control policy rule. Auditing session 24 may be a useful way to determine whether the rule is working as desired (e.g., attributes are being identified and appropriate response is being selected; etc.)

Enforcing response attribute 37 at 130 may include taking the specified access control action. Such access control action may include, as examples, but not as limitations, allowing client 14 to access a VLAN in network 12, allowing client 14 to access a NAZ in network 12, allowing access according to an ACL, denying access to network 12, setting an access port in network 12 to a default port, placing client 14 in a pre-admission group, etc. Network access may be enforced in communication system 10 depending on available enforcement method options in security appliance 20 (or applicable NAC clients). For example, a local firewall may block new outgoing connections based on the access control policy rule. In other embodiments, the enforcement method option can be set so that enforcement actions are controlled by some other network element (e.g., Microsoft Network Access Protection (NAP) platform, McAfee Network Security Platform, etc.).

For example, network 12 may be divided into numerous logical networks (e.g., VLANs), each VLAN comprising a set of devices, or having unique access restrictions, etc. By allowing access to certain VLANs, to the exclusion of other parts of network 12, network attacks may be contained within the affected VLANs. Similarly, unique NAZs may be mapped to corresponding health levels of clients 14(1)-14(N). A NAZ specifies a list of network resources, and designates whether those resources can or cannot be accessed. A NAZ's access type can specify whether client 14 is allowed or denied access to a resource within network 12. Thus, client 14(1) with a low health level (e.g., client 14(1) does not have a current antivirus software) may be denied access to certain sensitive network resources. On the other hand, client 14(2) with high health level may be permitted to access virtually any resource within network 12.

Ignoring the access control policy at 132 may be useful in situations where the policy may not be applied. For example, a network administrator may determine that printers in the network may be freely accessed by any user, with any health level, etc. In such a case, although the access control policy rule may specify a particular response (e.g., connect to VLAN 1), the network administrator may choose to have the policy ignored, for various reasons. Thus, when client 14 attempts to connect to a printer in network 12, and the access control policy rule indicates that client 14 should be connected to VLAN 1, but the printers in VLAN 1 are disconnected, gateway 16 (and/or security appliance 20) may ignore the access control policy, and connect client 14 to an available printer located elsewhere in network 12. At 134, a determination may be made whether to proceed to a next session 24. If yes, then operations may loop back to 108. Otherwise, the operations may end at 122.

For the sake of illustration, and not as a limitation, assume that communication system 10 includes a pre-admission rule (e.g., rule #0) enforcing a VLAN 999. Assume that another rule (e.g., rule #1) that enforces VLAN 900 for iPhones and yet another rule (e.g., rule #2) that enforces VLAN 1 for devices other than iPhones. When RADIUS session 24 is established by client 14, attribute collector 28(1) may capture session attributes 26 at 108. Rule derivation can start with rule #1 (e.g., comparing session attributes with rule #1 at step 110). Policy engine 32 may determine that a device type (which is an external attribute) is required at step 112 to determine whether rule #1 is a match. Consequently, step 114 may be initiated to query external attributes. Retrieving external attributes 30 may take some time and session 24 may time out in the meantime. Therefore, the operations steps to 120, and the pre-admit rule #0 may be used in the meantime. Consequently, response attribute 37 may indicate that client 14 should be placed in VLAN 999, and the operations may step through 124, 126 and 130, and client 14 may be placed in VLAN 999. As soon as the external asynchronous query is complete, rule derivation continues where it stopped (at rule #1, device type). If the device type of client 14 is an iPhone, rule #1 is determined to be a match and VLAN 900 may be applied at 130. If the device type of client 14 is a printer, rule #2 is determined to be a match (e.g., a default rule for devices other than iPhones), and client 14 may be placed into VLAN 1 at 130.

Turning to FIG. 4, FIG. 4 is an example screen shot of a policy configuration tool according to embodiments of communication system 10. The policy configuration tool may be implemented on policy definition module 22, RADIUS server 18, security appliance 20, NAS servers, and/or other suitable network elements within network 12. The policy configuration tool may be implemented as a wizard (e.g., a user interface that presents a user with a sequence of dialog boxes that lead the user through a series of well-defined steps); an application with a graphical user interface (GUI) allowing the user to configure policies in the GUI; a command line interface (CLI) allowing the user to create policies through commands, etc. Any mode of implementation of the policy configuration tool may be used within the broad teachings of the present disclosure. An example screen shot 150 is presented in FIG. 4 merely as an instance of a representation of the policy configuration tool. Various other formats, schemes, styles, interfaces, etc. may be used to configure access control policies within the broad teachings of the present disclosure.

Example screen shot 150 shows attributes in separate columns, and access control policy rules in separate rows. In one embodiment, some rules may be "default" rules, that handle a specific combination of external attributes 30 if there are no specific customer created rules for those external attributes. Such rules may be read-only rules in some embodiments. In other embodiments, such rules may be modified and saved as new rules. Examples of default rules are: (1) rule to handle pre-admission, for example, when client 14 accesses network 12, but all relevant attributes have not been retrieved yet; and (2) rule to handle post-admission, for example, to handle client 14 that has not matched any of the defined rules.

In the embodiment shown in FIG. 4, column 152 may represent the number of the applicable access control policy rule. Column 154 may represent whether the access control policy rule is active (e.g., enabled or disabled). In one embodiment, an access control policy rule may be made active at any time, regardless of whether policy definition module 22 is connected to network 12. In another embodiment, the access control policy rule may be made active when policy definition module 22 is connected to network 12. In yet another embodiment, the access control policy rule is made active when policy definition module is connected to a specific segment of network 12, etc. Each access control policy rule may be made active independent of the other access control policy rules. Column 156 represents the sensor that detects session 24. The sensor may be security appliance 20, or another network element in communication with policy definition module 22. Column 158 may represent a textual description of the rule. For example, a network administrator may choose to describe a rule as "pre-admission rule" to describe the rule to handle pre-admission groups. Column 160 represents the identity (e.g., name) of NAS (e.g., RADIUS server 18).

Column 162 may represent the health of client 14 that is attempting to access network 12. Health levels may be used to represent the state of client 14 based on network security rules of network 12. Each enterprise may define its own health levels, for example, healthy, fair, poor, serious, critical, unknown. The names of the health levels can be arbitrary and may have no intrinsic meaning. Health levels may be defined according to predetermined criteria, for example, on MNAC servers based on previously determined benchmarks. The ordering of the health levels, on the other hand, can indicate the relative health level. Client 14 may be assigned a health level based on evaluation of certain system security rules. For example, the system security rules may include: (1) antivirus software is installed; (2) antivirus software is running; (3) antivirus software is updated; (4) client 14 is scanned by network sensor; etc. Each rule allows a health level to be assigned to client 14 if the rule fails. For example, client 14 may be assigned the value "Healthy" if it passes all the rules (e.g., antivirus installed, running, updated, and scanned by network sensor). The value "Unknown" may be used prior to client 14 being scanned after bootup. Such a health level hierarchy may be used to progressively restrict network access according to how serious the impact a rule failure could have on network security.

Column 164 may represent the device group, such as printers, white listed devices, etc. The device group may relate to a target node (e.g., node within network 12 to which client 14 seeks access), or alternatively, the device group may relate to the node (e.g., client 14) initiating session 24. Column 166 may represent a user group (e.g., executives, administrators, etc.) Each user group may be identified from external attributes 30, for example, by accessing a user account database that stores user information. Each user group may be associated with unique access restrictions. For example, a standard user may have less access rights than an administrator; an accounting executive may be access rights to certain accounting devices whereas technicians on the manufacturing floor may be denied access rights to those accounting devices; etc.

Column 168 may represent any RADIUS attribute. The RADIUS attribute may be from known or unknown vendors. Embodiments of communication system 10 may parse session attributes 26, and determine if any RADIUS attribute specified in column 168 is present in session attributes 26. If yes, the applicable access control policy rule may be applied. Thus, the network administrator can specify any RADIUS attribute of choice, opening up implementations of policy definition module 22 to virtually any class of RADIUS attributes. Column 170 may represent the operational mode of the access control policy rule. For example, the operational mode may be "enforce," "audit," or "ignore." Column 172 may represent the access control action to be taken to enforce the access control policy rule.

Access control policy rules 174 as described herein may be organized into rows in any order. As examples, and not as limitations, default access control policy rule "--" may define a pre-admission access control policy rule. Any NAS, health level, device type, user group, and RADIUS attribute may trigger rule "--". Column 172 (i.e., response) may indicate that client 14 with such attributes may be placed in QVLAN, which may be a pre-admission logical grouping of network 12 with limited access to other regions of network 12. Access control policy rule 1 may be described as "ExecutiveMobile" and may apply for mobile device groups (e.g., iPads, iPhones, etc.) by executive users with any NAS, health level, and RADIUS attributes. Rule 1 may indicate that the executive accessing network 12 be placed into VLAN 1. Rule 2 may indicate that if NAS named "Crown Jewel" is handling session 24, then session 24 can be audited (e.g., monitored, reported, etc.) and client 14 accessing network 12 with the specified attributes may be denied access (e.g., by closing port). Other such rules 174 may be implemented within the broad scope of the present disclosure.

Turning to FIG. 5, FIG. 5 is another example screen shot associated with an embodiment of communication system 10. Example screen shot 180 may provide options to edit each cell content, such as drop-down menu, free-form text entry, etc. The example editing options illustrated in FIG. 5 and discussed herein are merely for example purposes, and are not intended to be limitations in any way. For example, drop down menu box 182 may enable a network administrator to choose between two options, "enable," and "disable." Various other choices may also be presented without changing the scope of the present disclosure. Text entry box 184 may permit the network administrator to enter a textual free form entry for a rule description. Drop down menu box 186 may allow specification of the health level (e.g., "any," "bad," "good," etc.). Drop down menu box 188 may allow the network administrator to choose to enforce, audit, or ignore the access control policy rule. Various other options for editing attributes and creating access control policy rules are contemplated within the broad scope of the present disclosure.

Figure 6:
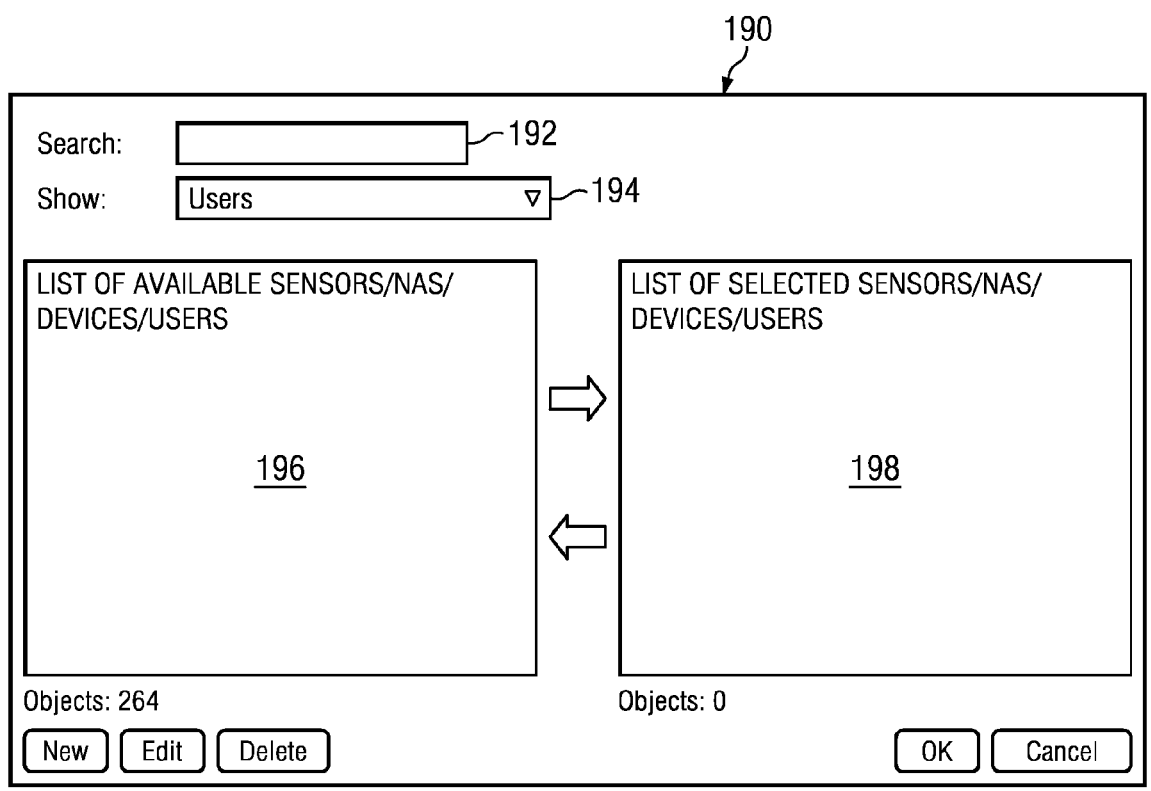
FIG. 6 is a simplified diagram illustrating yet another example screen shot according to an embodiment of the communication system.

Turning to FIG. 6, FIG. 6 is yet another example screen shot associated with an embodiment of communication system 10. Example screen shot 190 may pop up when the network administrator clicks on columns 156, 160, 164, or 166 of FIG. 4. In various embodiments, a search box 192 may be provided that permits the network administrator to search for named sensors, NAS, device groups, or user groups. A drop-down menu box 194 may allow viewing one of sensors, NASs, device groups, or user groups. Box 196 may present a real-time filter of all available. sensors/NAS/devices/users, etc. Devices may follow a hierarchical list (e.g., based on device types, device groups, operating systems, etc.). Each element on the hierarchical list may have further parent and/or child levels in the hierarchy. Suitable filtering may be implemented to display relevant devices in box 196. The network administrator may select one or more available sensors/NAS/devices/users, etc., and the selections may be shown in box 198. Options may also be provided to create new, edit, or delete custom objects on the fly. The example provided herein is merely for illustrative purposes. Various other options for editing attributes and creating access control policy rules are contemplated within the broad scope of the present disclosure.

Figure 7:
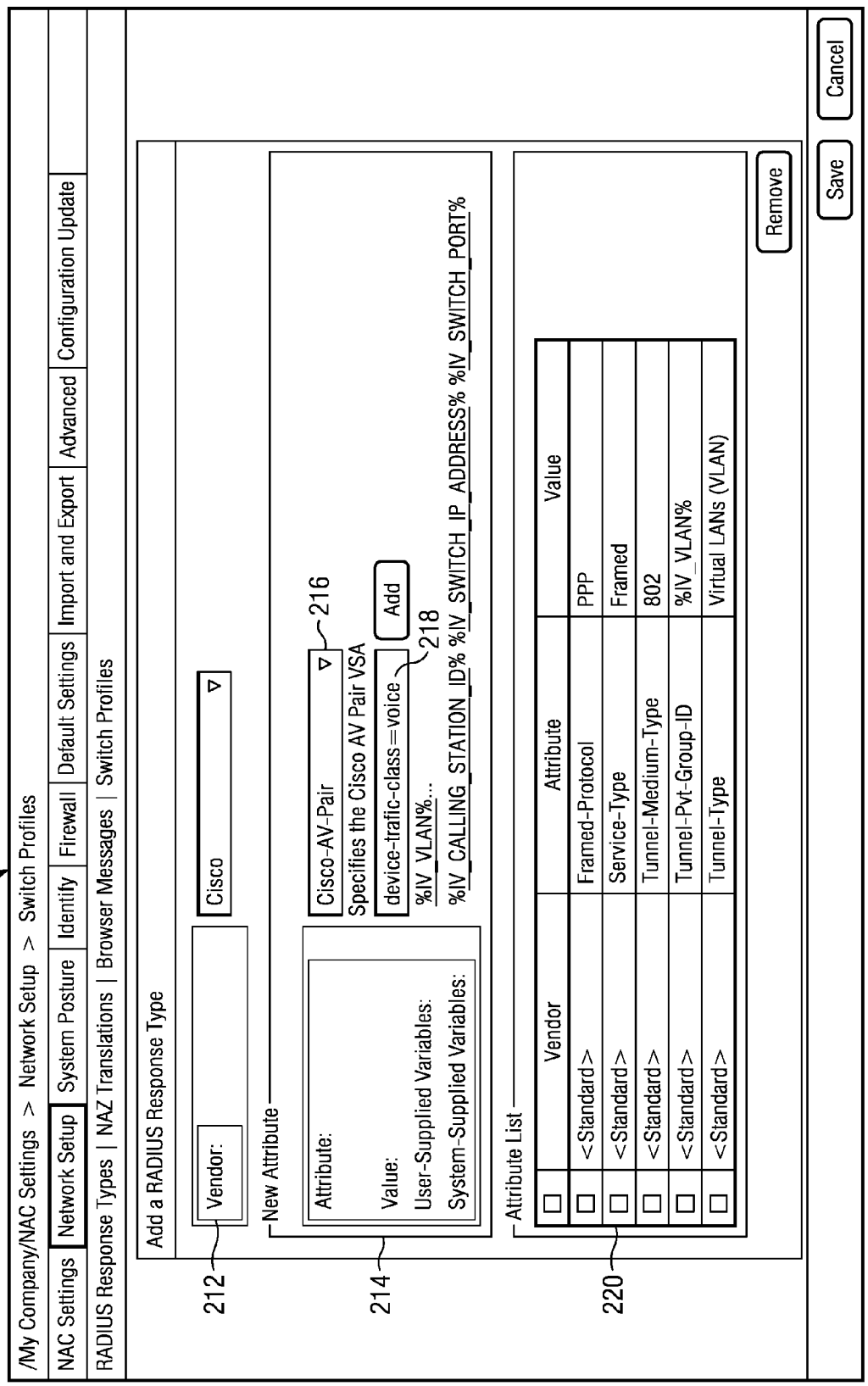
FIG. 7 is a simplified diagram illustrating yet another example screen shot according to an embodiment of the communication system.

Turning to FIG. 7, FIG. 7 is yet another example screen shot associated with an embodiment of communication system 10. Example screen shot 210 may illustrate an option to insert certain RADIUS attributes as response attributes in access control policy rule definitions. A box 212 may be provided for specifying a particular vendor (e.g., for the RADIUS attributes), and a box 214 may be provided to define new attributes. For example, a box 216 may be a drop-down menu box showing a list of possible VSA names to select. A box 218 may allow the network administrator to add a desired value for the selected VSA name. A box 220 may display the list of selected RADIUS attributes. The selected RADIUS attributes may be used to define the applicable access control policy rule. The example provided herein is merely for illustrative purposes. Various other options for editing attributes and creating access control policy rules are contemplated within the broad scope of the present disclosure.

In one example embodiment, variables in the form of % IV_VLAN % can be used to indicate that those variables will be replaced by certain values when the corresponding response is applied. % IV_VLAN % may be entered by the network administrator during rule definition and as such could be a "User-supplied Variable". Other "system supplied variables" may also be included. For example, % IV_SWITCH_PORT % may be reused from an earlier RADIUS session. In another example, system supplied variables may include a generic % IV_VALUE_FROM_PACKET % variable. Security appliance 20 may insert the actual value seen in a RADIUS session into the % IV_VALUE_FROM_PACKET % variable. Thus, any RADIUS attribute, even those that are previously unseen, can be addressed.

Figure 8:
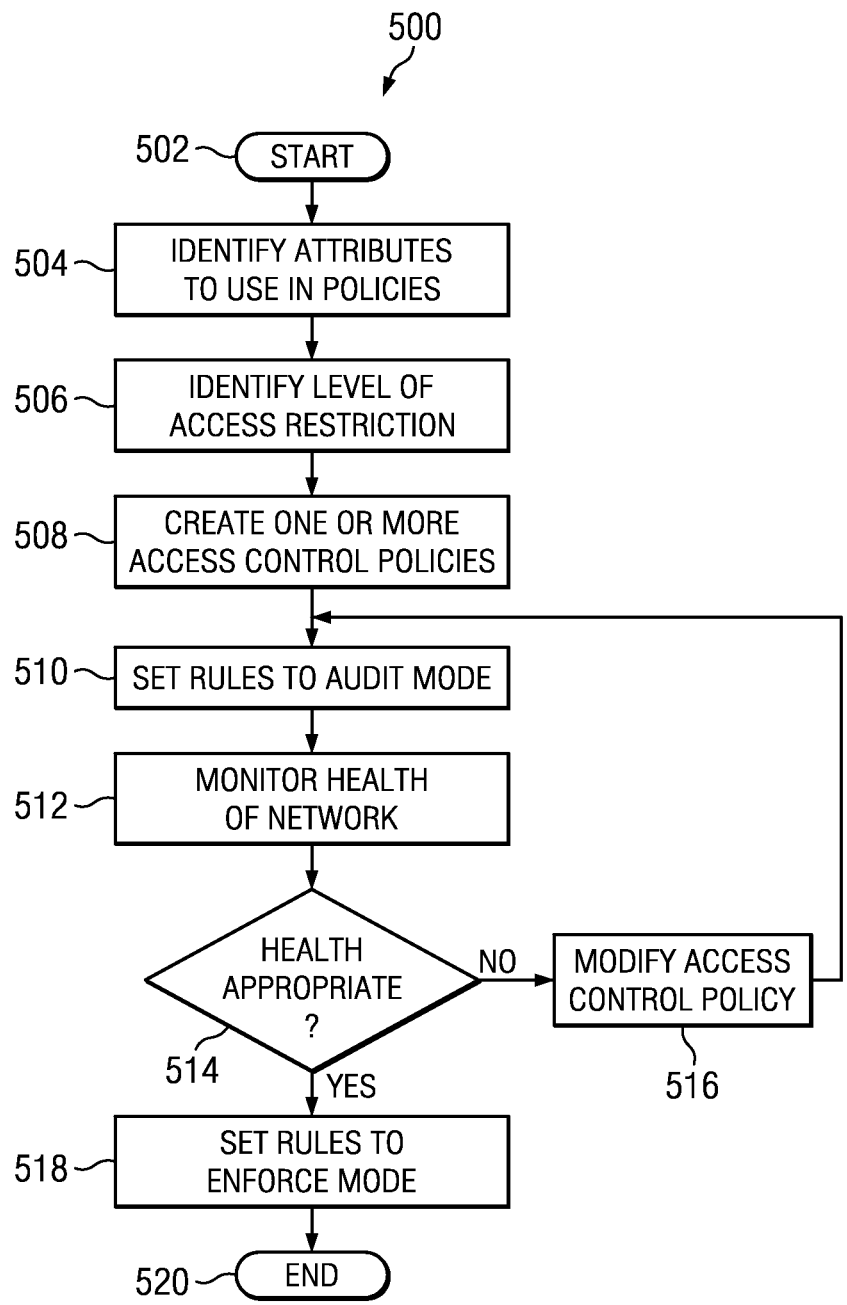
FIG. 8 is a simplified flow diagram illustrating example operational activities that may be associated with embodiments of the present disclosure.

Turning to FIG. 8, FIG. 8 is a simplified flow diagram illustrating an example flow for creating access control policy rules. Operations 500 start at 502, when communication system 10 is activated. At 504, attributes to use in access control policies may be identified. The attributes may include session attributes 26 and external attributes 30. At 506, levels of access restrictions may be identified. For example, "allow," "deny," "switch port default," etc. may be determined to be practical or desired for each type of security violation. At 508, one or more access control policies may be defined. Concurrent with the identification, the access control policies may also be assigned to sub-systems (e.g., managed systems) within network 12.

At 510, the rules may be set to audit mode. In some embodiments, the rules may specify checks to assess each attribute of each access control policy. For example, checks to assess each health policy and a health level may be applied to each rule that is appropriate for the severity of the rule violation. At 512, health of network 12 may be monitored. In some embodiments, monitoring may be effected through scans (e.g., periodic scans, user-requested scans, etc.). In other embodiments, real-time checks for network attacks may be implemented through appropriate sensors and/or security appliance 20 located in network 12.

At 514, a determination may be made whether the health of network 12 is appropriate. The health may be appropriate, for example, when the rules deny access to network attacks, and allow access to legitimate clients. At 516, if the health is not appropriate (e.g., access is being allowed to inappropriate clients), the relevant access control policy may be modified. Otherwise, the rules may be set to enforce mode at 518. The operations may end at 520.

In example embodiments, at least some portions of the activities outlined herein may be implemented in non-transitory logic (i.e., software) provisioned in, for example, security appliance 20 (or in client 14, or RADIUS server 18). This can include one or more instances of policy definition module 22 (e.g., including policy engine 30, attribute collectors 28(1)-28(M), and/or attribute enforcer 28) being provisioned in various locations of the network. In some embodiments, one or more of these features may be implemented in hardware, provided external to these elements, or consolidated in any appropriate manner to achieve the intended functionality. Security appliance 20, client 14, and/or RADIUS server 18 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of communication system 10 described and shown herein may also include suitable interfaces for receiving, transmitting, and/or otherwise communicating data or information in a network environment. Additionally, some of the processors and memory associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 44) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 42) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. Logic encoded in non-transitory media that includes code for execution and when executed by a processor is operable to perform operations comprising:
configuring an access control policy for a network environment, wherein the access control policy includes one or more attributes and a level of access restriction;
setting an access control policy rule that implements the access control policy to an audit mode;
monitoring health of the network environment to determine whether the health of the network environment is appropriate based on the level of access restriction;
modifying the access control policy if the health of the network environment is inappropriate; and
setting the access control policy rule to an enforce mode if the health of the network environment is appropriate.

2. The logic of claim 1, the operations further comprising:
identifying the one or more attributes to include in the access control policy, wherein the one or more attributes include at least one of:
session attributes for a session that can be initiated by a first node in an attempt to access a second node; and
external attributes associated with the first node and the second node.

3. The logic of claim 2, wherein the session attributes include RADIUS VSA information from an unknown vendor.

4. The logic of claim 2, wherein the session attributes and the external attributes comprise at least one selection from a group including: a point of attachment, a health level of a first node attempting to access a second node, a user group of a first node, a device group of a first node, another device group of a second node, RADIUS attributes, and time of day.

5. The logic of claim 1, the operations further comprising:
identifying the level of access restriction to include in the access control policy, wherein the level of access restriction is selected from a group comprising: an allow level, a deny level, and a switch port default level.

6. The logic of claim 1, the operations further comprising:
assigning the access control policy to a sub-system within the network environment.

7. The logic of claim 1, wherein the access control policy rule includes one or more checks to assess each of the one or more attributes of the access control policy.

8. The logic of claim 1, wherein monitoring the health of the network environment includes at least one of:
periodic scans of the network environment;
user-requested scans of the network environment; and
real-time checks for network attacks in the network environment.

9. The logic of claim 1, wherein the health of the network environment is determined to be inappropriate if access is being allowed in the network environment for inappropriate nodes according to the access control policy.

10. An apparatus, comprising:
a memory element configured to store instructions; and
a processor that executes the instructions, such that the apparatus is configured for:
configuring an access control policy for a network environment, wherein the access control policy includes one or more attributes and a level of access restriction;
setting an access control policy rule that implements the access control policy to an audit mode;
monitoring health of the network environment to determine whether the health of the network environment is appropriate based on the level of access restriction;
modifying the access control policy if the health of the network environment is inappropriate; and
setting the access control policy rule to an enforce mode if the health of the network environment is appropriate.

11. The apparatus of claim 10, further configured for:
identifying the one or more attributes to include in the access control policy, wherein the one or more attributes include at least one of:
session attributes for a session that can be initiated by a first node in an attempt to access a second node; and
external attributes associated with the first node and the second node.

12. The apparatus of claim 11, wherein the session attributes include RADIUS VSA information from an unknown vendor.

13. The apparatus of claim 11, wherein the session attributes and the external attributes comprise at least one selection from a group including: a point of attachment, a health level of a first node attempting to access a second node, a user group of a first node, a device group of a first node, another device group of a second node, RADIUS attributes, and time of day.

14. The apparatus of claim 10, further configured for:
identifying the level of access restriction to include in the access control policy, wherein the level of access restriction is selected from a group comprising: an allow level, a deny level, and a switch port default level.

15. The apparatus of claim 10, further configured for:
assigning the access control policy to a sub-system within the network environment.

16. The apparatus of claim 10, wherein monitoring the health of the network environment includes at least one of:
periodic scans of the network environment;
user-requested scans of the network environment; and
real-time checks for network attacks in the network environment.

17. The apparatus of claim 10, wherein the health of the network environment is determined to be inappropriate if access is being allowed in the network environment for inappropriate nodes according to the access control policy.

18. A method comprising:
configuring an access control policy for a network environment, wherein the access control policy includes one or more attributes and a level of access restriction;
setting an access control policy rule that implements the access control policy to an audit mode;
monitoring health of the network environment to determine whether the health of the network environment is appropriate based on the level of access restriction;
modifying the access control policy if the health of the network environment is inappropriate; and
setting the access control policy rule to an enforce mode if the health of the network environment is appropriate.

19. The method of claim 18, further comprising:
identifying the one or more attributes to include in the access control policy, wherein the one or more attributes include at least one of:
session attributes for a session that can be initiated by a first node in an attempt to access a second node; and
external attributes associated with the first node and the second node.

20. The method of claim 18, further comprising:
identifying the level of access restriction to include in the access control policy, wherein the level of access restriction is selected from a group including: an allow level, a deny level, and a switch port default level.

* * * * *